(12) United States Patent
Higuchi et al.

(10) Patent No.: US 12,249,129 B2
(45) Date of Patent: Mar. 11, 2025

(54) MACHINE LEARNING METHOD AND INFORMATION PROCESSING APPARATUS FOR MACHINE LEARNING

(71) Applicant: HITACHI HIGH-TECH CORPORATION, Tokyo (JP)

(72) Inventors: Haruhiko Higuchi, Tokyo (JP); Mitsuji Ikeda, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 353 days.

(21) Appl. No.: 17/794,791

(22) PCT Filed: Dec. 2, 2020

(86) PCT No.: PCT/JP2020/044928
§ 371 (c)(1),
(2) Date: Jul. 22, 2022

(87) PCT Pub. No.: WO2021/161628
PCT Pub. Date: Aug. 19, 2021

(65) Prior Publication Data
US 2023/0080978 A1 Mar. 16, 2023

(30) Foreign Application Priority Data
Feb. 12, 2020 (JP) .................... 2020-021453

(51) Int. Cl.
*G06V 10/778* (2022.01)
*G06V 10/776* (2022.01)

(52) U.S. Cl.
CPC ........ *G06V 10/7788* (2022.01); *G06V 10/776* (2022.01)

(58) Field of Classification Search
CPC ........ G06N 20/00; G06T 7/00; G06V 10/776; G06V 10/7788
See application file for complete search history.

(56) References Cited

U.S. PATENT DOCUMENTS

2015/0193698 A1   7/2015   Nakamura et al.
2018/0089818 A1*  3/2018   Kobayashi .............. G06T 7/001
(Continued)

FOREIGN PATENT DOCUMENTS

CN   101667263 A  *  3/2010   ............. G09B 19/00
JP   2015-129988 A     7/2015
(Continued)

OTHER PUBLICATIONS

Wei Li et al.,"Automated defect analysis in electron microscopic images," Jul. 18, 2018,npj Computational Materials( 2018) 36, pp. 1-7.*

(Continued)

*Primary Examiner* — Omar S Ismail
(74) *Attorney, Agent, or Firm* — Volpe Koenig

(57) ABSTRACT

The preset invention aims to provide a method of presenting a learning condition which enables an improvement in the accuracy of image analysis. An information processing
(Continued)

apparatus for machine learning is provided which includes a true/false information generating unit which generates true/false information of an image analysis result, a reliability determining unit which determines reliability related to analysis in image analysis processing, and a learning condition output unit which presents a learning condition, based on the true/false information and the reliability.

13 Claims, 5 Drawing Sheets

(56) References Cited

U.S. PATENT DOCUMENTS

| | | | | |
|---|---|---|---|---|
| 2018/0314919 | A1* | 11/2018 | Onozawa | G06V 10/762 |
| 2019/0139212 | A1* | 5/2019 | Hanzawa | G06N 3/08 |
| 2019/0139213 | A1* | 5/2019 | Kurita | G06F 18/214 |
| 2019/0197356 | A1* | 6/2019 | Kurita | G06F 18/2178 |
| 2019/0362134 | A1* | 11/2019 | Kim | G06V 10/82 |
| 2021/0035553 | A1* | 2/2021 | Nakamura | G10L 15/22 |
| 2021/0099642 | A1* | 4/2021 | Ogawa | G06N 3/08 |
| 2021/0195128 | A1* | 6/2021 | Hanada | G06F 18/217 |
| 2022/0044383 | A1* | 2/2022 | Koshihara | G06V 10/454 |

FOREIGN PATENT DOCUMENTS

| | | | |
|---|---|---|---|
| JP | 2019-021201 A | 2/2019 | |
| WO | WO-2019117065 A1 * | 6/2019 | ............... G06T 7/00 |
| WO | WO-2022185436 A1 * | 9/2022 | ............ G06V 10/141 |

OTHER PUBLICATIONS

Andrew Janowczyk et al.,"Deep learning for digital pathology image analysis: A comprehensive tutorial with selected use cases," Jul. 26, 2016,2016 Journal of Pathology Informatics I:29,pp. 1-15.*
Quoc Dang Vu et al.,"Methods for Segmentation and Classification of Digital Microscopy Tissue Images," Apr. 2, 2019,Frontiers in Bioengineering and Biotechnology,Apr. 2019,vol. 7,Article 53,pp. 1-12.*
Alex Kendal et al.,"What Uncertainties Do We Need in Bayesian Deep Learning for Computer Vision?," 31st Conference on Neural Information Processing Systems (NIPS 2017), pp. 1-8.*
Alex Kendall et.al, What Uncertainties Do We Need in Bayesian Deep Learning for Computer Vision? 31st Conference on Neural Information Processing Systems (NIPS 2017), Long Beach, CA, USA 2017, pp. 1-12.
International Search Report with English Translation, PCT/JP2020/044928, Feb. 16, 2021 (5 pgs).

* cited by examiner

| | TRUE/FALSE INFORMATION OF ANALYSIS RESULT | RELIABILITY OF MODEL | LEARNING CONDITION |
|---|---|---|---|
| (1) | TRUE | ≥a | MAINTAIN LEARNING CONDITION |
| (2) | TRUE | <a | ADD TO LEARNING DATA |
| (3) | FALSE | ≥b | CHANGE LEARNING SETTING VALUE |
| (4) | FALSE | <b | ADD TO LEARNING DATA |

420

| | TRUE/FALSE INFORMATION OF ANALYSIS RESULT | RELIABILITY OF DATA | LEARNING CONDITION |
|---|---|---|---|
| (5) | TRUE | ≥c | MAINTAIN LEARNING CONDITION |
| (6) | TRUE | <c | REACQUISITION OF DATA, DEPRECATION OF LEARNING DATA ADDITION |
| (7) | FALSE | ≥d | CHANGE LEARNING SETTING VALUE |
| (8) | FALSE | <d | REACQUISITION OF DATA, DEPRECATION OF LEARNING DATA ADDITION |

MACHINE LEARNING METHOD AND INFORMATION PROCESSING APPARATUS FOR MACHINE LEARNING

TECHNICAL FIELD

The present invention relates to an information processing technique related to machine learning.

BACKGROUND ART

A processing apparatus using machine learning has been required to improve the reliability and accuracy of processing such as recognition obtained by learning.

For example, Patent Literature 1 discloses a technique of selecting learning data in an image recognition technique using machine learning. According to the technique disclosed in Patent Literature 1, it is possible to suppress a decrease in recognition accuracy of image recognition processing due to learning against unexpected environmental changes.

Further, a technique of evaluating uncertainty in cognition (Epistemic Uncertainty) and accidental uncertainty (Aleatoric Uncertainty) in deep learning has been reported in Non-Patent Literature 1.

CITATION LIST

Patent Literature

PTL 1: Japanese Unexamined Patent Application Publication No. 2019-21201

Non-Patent Literature

NPTL 1: "What Uncertainties Do We Need in Bayesian Deep Learning for Computer Vision?" Alex Kendall et. al, 31st Conference on Neural Information Processing Systems (NIPS 2017), Long Beach, CA, USA.

SUMMARY OF INVENTION

Technical Problem

In Patent Literature 1, when image recognition processing is performed, data low in reliability of discrimination and small in its frequency is selected as data to be used for learning.

However, when the amount of data to be analyzed is large and the data or the object to be recognized from the data has different importance as in material analysis using an electron microscope, the accuracy of analysis may decrease even if the data low in reliability of discrimination and small in its frequency is used for learning. For example, even if a shooting environment changes, it is required to be able to detect an object higher in importance.

An object of the present invention is to provide a method of presenting a learning condition which enables an improvement in the accuracy of image analysis.

Solution to Problem

A preferred aspect of the present invention is an information processing apparatus for machine learning, which includes a true/false information generating unit which generates true/false information of an image analysis result, a reliability determining unit which determines reliability related to analysis in image analysis processing, and a learning condition output unit which presents a learning condition, based on the true/false information and the reliability.

Another preferred aspect of the present invention is a machine learning method of an image analysis device which is implemented with a model to which machine learning using learning data is applied and performs image analysis on an input image. In this method, a first step of making a true/false determination as to an analysis result of the image analysis device related to the input image, a second step of evaluating the reliability of image analysis including at least one of model reliability and data reliability, and a third step of based on the true/false determination and the reliability of the image analysis, presenting at least one of maintaining the status quo, recommending that the input image is used for the learning data, recommending that the input image is not used for the learning data, and a change of a learning setting value are executed.

A more specific aspect will be described. A fourth step of comparing the reliability of the model with a predetermined threshold value to identify the magnitude is executed. In the third step, when the analysis result is true and the reliability of the model is high, the status quo is suggested to be maintained. When the analysis result is true and the reliability of the model is low, the recommendation to use the input image for the learning data is presented. When the analysis result is false and the reliability of the model is high, the change of the learning setting value is presented. When the analysis result is false and the reliability of the model is low, the recommendation to use the input image for the learning data is presented.

Another more specific aspect will be described. A fifth step of comparing the reliability of the data with a predetermined threshold value to identify the magnitude is executed. In the third step, when the analysis result is true and the reliability of the data is high, the status quo is suggested to be maintained. When the analysis result is true and the reliability of the data is low, the recommendation not to use the input image for the learning data is presented. When the analysis result is false and the reliability of the data is high, the change of the learning setting value is presented. When the analysis result is false and the reliability of the data is low, the recommendation not to use the input image for the learning data is presented.

Advantageous Effects of Invention

According to the present invention, it is possible to present a learning condition which enables an improvement in the accuracy of image analysis. Problems, configurations, and effects other than those mentioned above will be made apparent from the description of the following embodiments.

BRIEF DESCRIPTION OF DRAWINGS

FIG. 4 is a table diagram for describing an example of determination of a learning condition.

DESCRIPTION OF EMBODIMENTS

Figure 1:
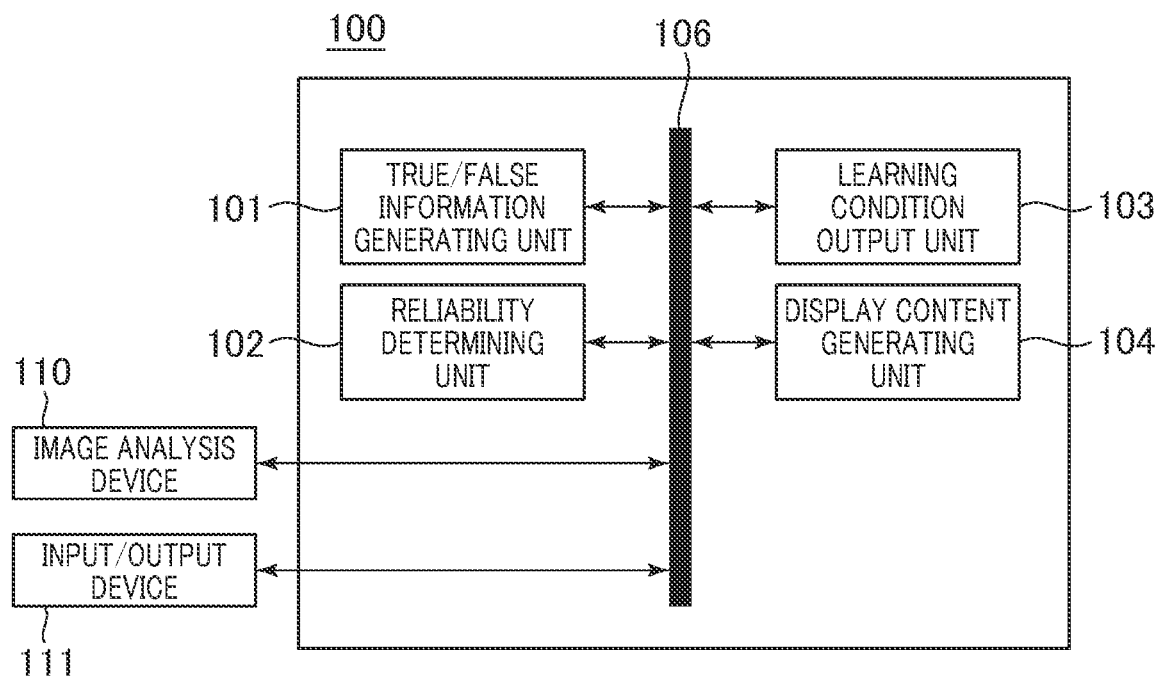
FIG. 1 is a block diagram showing a functional configuration example of an information processing apparatus for machine learning.

Hereinafter, embodiments of the present invention will be described in detail based on the drawings. Note that the embodiments described below do not limit the invention according to the claims, and all of various elements and combinations thereof described in the embodiments are not necessarily indispensable for the means for solving the invention. Further, an embodiment in which various elements described in the embodiment are appropriately combined is also included in the embodiments disclosed in the present application.

In the configuration of the invention described below, the same reference numerals may be used in common among different drawings for the same parts or parts having similar functions, and dual description may be omitted.

When there are a plurality of elements having the same or similar functions, they may be described by adding different subscripts to the same reference numerals. However, when it is not necessary to distinguish between a plurality of elements, the subscripts may be omitted for description.

The notations such as "first", "second", and "third" in the present specification and the like are attached to identify the components and do not necessarily limit the number, order or contents thereof. Further, the numbers for identifying the components are used for each context, and the numbers used in one context do not necessarily indicate the same constitution in other contexts. In addition, the component identified by a certain number is not prevented from functioning as the component identified by another number.

The position, size, shape, range, etc. of each configuration shown in the drawings and the like may not represent the actual position, size, shape, range, etc. in order to facilitate understanding of the invention. Therefore, the present invention is not necessarily limited to the position, size, shape, range, etc. disclosed in the drawings and the like.

The publications, patents and patent applications cited in the present specification, as they are, constitute part of the description herein.

Components represented in singular form in the present specification shall include the plural form unless explicitly stated in the context.

An example of an information processing apparatus for machine learning described in the embodiment is used for applications each supporting the learning of an analysis device to which machine learning is applied. The machine learning includes one which learns a neural network using learning data (teacher data). The apparatus has a true/false information generating unit which generates true/false information of an image analysis result, a reliability determining unit which determines reliability related to analysis in image analysis processing, and a learning condition output unit which presents a learning condition, based on the true/false information and reliability.

Such an information processing apparatus for machine learning can be configured by a general information processing apparatus, for example, a server. Similar to a general server, such an information processing apparatus for machine learning includes a control device, a storage device, an input device, an output device, and a bus connecting each unit. A program executed by the apparatus is assumed to be pre-incorporated in the storage device. In the following description, the control device, the storage device, the input device, and the output device that the information processing apparatus naturally has will be described by paying attention to the functions realized by the apparatus without intentionally illustrating them.

Specifically, each function is stored in the storage device and realized by the program executed in the processing apparatus. That is, in the present embodiment, functions such as calculation and control are realized in cooperation of specified processing with other hardware by executing the program stored in the storage device by the processing apparatus. A program executed by a computer or the like, its function, or a means for realizing the function may be referred to as a "function", a "means", a "part", a "unit", a "module", or the like.

The information processing apparatus for machine learning may be configured of a single device, or any part of the input device, the output device, the processing device, and the storage device may be configured by another computer connected by a network. The idea of the invention is equivalent and unchanged.

In the present embodiment, the same functions as those configured by software can also be realized by hardware such as an FPGA (Field Programmable Gate Array) and an ASIC (Application Specific Integrated Circuit). Such aspects are also included in the scope of the present invention.

FIG. 1 is a block diagram showing a configuration example of an information processing apparatus 100 for machine learning according to an embodiment. The information processing apparatus 100 for machine learning includes a true/false information generating unit 101, a reliability determining unit 102, a learning condition output unit 103, and a display content generating unit 104. The true/false information generating unit 101, the reliability determining unit 102, the learning condition output unit 103, and the display content generating unit 104 are connected via a bus 106. The bus 106 holds data, control information, and analysis information handled by each processing unit connected to the bus 106, or mediates their transmission.

As mentioned at the beginning, in the present embodiment, the true/false information generating unit 101, the reliability determining unit 102, the learning condition output unit 103, and the display content generating unit 104 are implemented by software. Further, the information processing apparatus 100 for machine learning is provided with various input/output devices and interfaces that are normally provided as information processing devices.

The information processing apparatus 100 for machine learning is connected to an image analysis device 110 and an input/output device 111 via the bus 106. The information processing apparatus 100 for machine learning may be connected to the image analysis device 110 and the input/output device 111 by wire or may be connected thereto wirelessly. Incidentally, although the image analysis device 110 and the input/output device 111 are shown in FIG. 1 as an example in which they are provided outside the information processing apparatus 100 for machine learning, they may be built in the information processing apparatus 100 for machine learning.

The image analysis device 110 has a function of analyzing a specific object from an image. The processing of analyzing the image may be one to classify whether or not the image has a specific feature and calculate one or more classification results, or one to detect an area including a specific target in the image and calculate the position and size of the target in the image, or one to divide an area including the specific target in the image into segments and calculate same as images color-separated from other targets. Hereinafter, the processing of analyzing the specific target from the image will be referred to as image analysis as represented by image classification, image detection, and image segmentation. The known technique is used for the image analysis processing.

As a typical example, the image analysis device 110 can be configured by a deep neural network (DNN) or the like in which internal parameters are set by supervised learning. The corresponding configuration may be implemented by software or may be configured by hardware like an FPGA. The image analysis device 110 is generally defined as a function approximator which provides a predetermined output with respect to a predetermined input. When a general function approximator is used, the input may be image data as described above, or audio or other types of data may be taken as the input.

Figure 2:
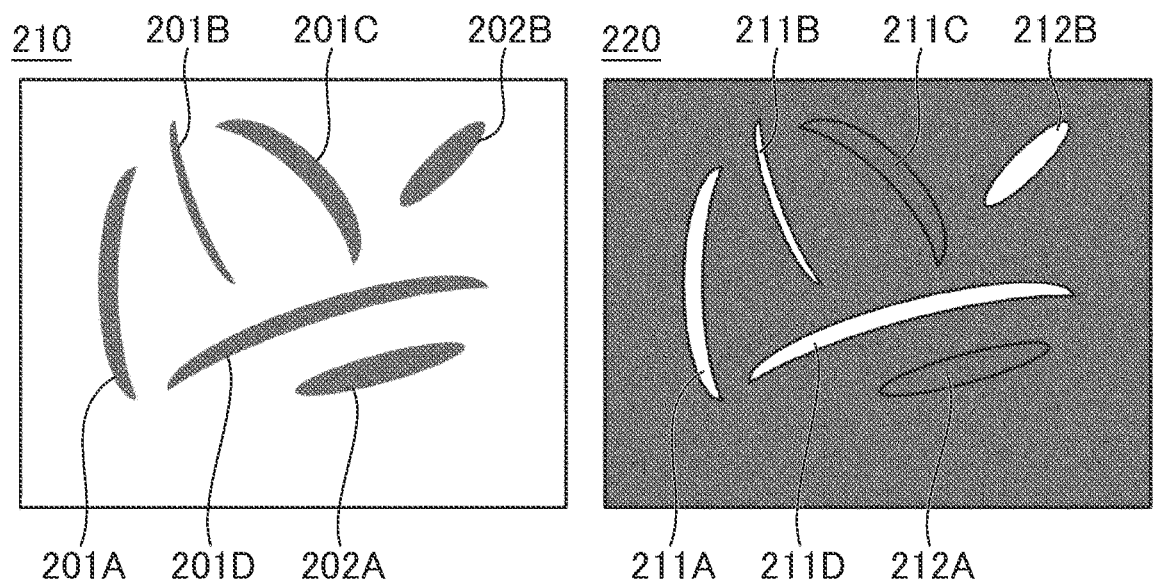
FIG. 2 is an explanatory view showing an example of an image to be analyzed and an image of an analysis result.

FIG. 2 shows an example of an image analysis result by the image analysis device 110. A captured image 210 shows a state in which a crescent-shaped object 201 and an elliptical object 202 are mixed as an example of an image captured by a microscope. For example, when the captured image 210 is input, the image analysis device 110 identifies and classifies the crescent-shaped object 201 and the elliptical object 202.

For example, as to this captured image 210, an image example of the result of image analysis so that the crescent-shaped object 201 is color-coded into white and segmented, and the elliptical object 202 and the background are color-coded into gray and segmented is shown in an analysis result image 220.

In the analysis result image 220, there are segments 211A, 211B, and 211D in which crescent-shaped objects 201A, 201B, and 201D are correctly segmented in white, and a segment 212A in which an elliptical object 202A is correctly segmented in gray. On the other hand, the analysis result image 220 includes a segment 211C in which a crescent-shaped object 201C is not correctly segmented, and a segment 212B in which an elliptical object 202B is not correctly segmented.

The input/output device 111 has a function of outputting information about the true/false of the analysis result processed by the image analysis device 110 to the information processing apparatus 100 for machine learning. As an example of outputting the information about the true/false, for example, the analysis result by the image analysis device 110 is displayed as an image on the input/output device 111 in the form of the analysis result image 220, and the user is made to select the true/false of the analysis. The selected result is output to the information processing apparatus 100 for machine learning.

In this case, the input/output device 111 is configured by for example, a PC having a display displaying an image and a mouse or a keyboard which can be operated by the user. However, the input/output device may be one in which the analysis result image 220 is output to the user, and the true/false of an analysis result is input by the user. For example, it may be a touch panel display of a smartphone or a tablet terminal, one in which an image result is printed by a printer, or one in which a user's selection is input by voice.

The information processed by the input/output device 111 and output to the information processing apparatus 100 for machine learning may be one in which the true/false of an analysis result is selected by the user, or one in which an expected analysis result is created by the user. Further, as another example of outputting information on the true/false, information by an analysis means different from the image analysis device 110 is output from the input/output device 111 to the information processing apparatus 100 for machine learning. For example, when analyzing the distance from a monocular camera to an object by the image analysis device 110 using an image of the object taken by the monocular camera, the distance measured in advance by a 3D sensor such as a laser scanner or a TOF camera is used as true answer information, and the input/output device 111 outputs this true answer information to the information processing apparatus 100 for machine learning. The known technique is used as a means for obtaining the true answer information.

An example of a method of selecting the true/false of analysis by the user will be described using FIG. 3. An image 310 presented to the user is created based on the analysis result image 220, and prompts the user to select the true/false of the analysis result. As an example of selection by the user, in FIG. 3, a cursor 301 is operated to select the true/false of each segment. The result selected by the user is shown in a true/false selection result image 320.

As a result of selection by the user, when the analysis result is judged to be true (the crescent-shaped object 201 is segmented in white, or the elliptical object 202 is segmented in gray), it is displayed as "true". When the analysis result is judged to be false (the object that is not the crescent-shaped object 201 being segmented in white, or the crescent-shaped object 201 being segmented in gray), it is displayed as "false". When the analysis result is judged not to be important (unnecessary to reflect it in the following learning), it is displayed as "unselected".

The true/false information generating unit 101 generates true/false information of the image analysis result on the basis of the information input from the input/output device 111. The particle size of the true/false information is arbitrary, but in the example of FIG. 3, the true/false information is given in correspondence with each segment. That is, in this example, the true/false information corresponds to a partial area of the image. Alternatively, a true/false determination may be performed for each image on the basis of the number of true/false counts and the true/false ratio.

The reliability determining unit 102 determines the reliability of the image analysis. Here, the reliability refers to uncertainty in the image analysis. When the modeling of the image analysis processing is not sufficiently made precise when statistically modeling the image analysis processing by machine learning, etc., the modeled analysis processing has uncertainty upon giving data high in analysis difficulty, so that the analysis result may vary and the analysis accuracy may decrease. At this time, it can be said that "the model is uncertain", and thereafter, it is referred to as "the reliability of the model being low". This case is called uncertainty in recognition in the above-mentioned Non-Patent Literature 1.

Further, even if the modeling of the image analysis processing is sufficiently precise, when data to be analyzed contains noise locally and becomes high in analysis difficulty as compared with others, the data has uncertainty, so that the analysis result may vary and the analysis accuracy may decrease. At this time, it can be said that "the data is uncertain", and hereinafter, it is referred to as "the reliability of the data is low". This case is called aleatoric uncertainty in Non-Patent Literature 1 described above.

The reliability determining unit 102 calculates the reliability of the model and the reliability of the data. The reliability determined by the reliability determining unit 102 may be only the reliability of the model, only the reliability of the data, or both the reliability of the model and the reliability of the data. As a method for calculating the reliability of the model and the reliability of the data, for example, the known technique described in Non-Patent Literature 1 is used. As described in Non-Patent Literature 1, the reliability of the model and the reliability of the data can be visually indicated as continuous values corresponding to a partial area of the image, for example, by contrast or color difference.

The learning condition output unit 103 determines and presents the learning condition on the basis of the true/false information of the image analysis result generated by the true/false information generating unit 101 and the reliability of the image analysis determined by the reliability determining unit 102.

FIG. 4 is a table diagram showing an example of a rule for determining a learning condition, based on true/false information of an image analysis result and reliability of image analysis. Such a rule is determined in advance by the user and is stored in a storage device (not shown) of the information processing apparatus 100 for machine learning as data in a table format, for example. The learning condition output unit 103 performs determination with reference to the rule.

A table 410 in FIG. 4 is an example of determining the learning condition from the true/false information of the analysis result and the reliability of the model. It determines whether or not the reliability of the model is high by using a threshold value a or b in regard to its reliability. The threshold value is defined in advance by the user as part of the rule.

In 410 (1), since it is determined that the analysis result is true and the reliability of the model is high, it is considered that the learning of the image analysis device 110 is appropriate. In this case, there is presented a determination result so as to maintain the learning condition (maintain the status quo).

In 410 (2) and (4), since the reliability of the model is low, it is determined that the analysis accuracy is improved by learning by adding the corresponding data to the learning data. By setting the threshold value b to be smaller than the threshold value a, the one (4) whose analysis result is false can be preferentially added to the learning data.

Figure 5:
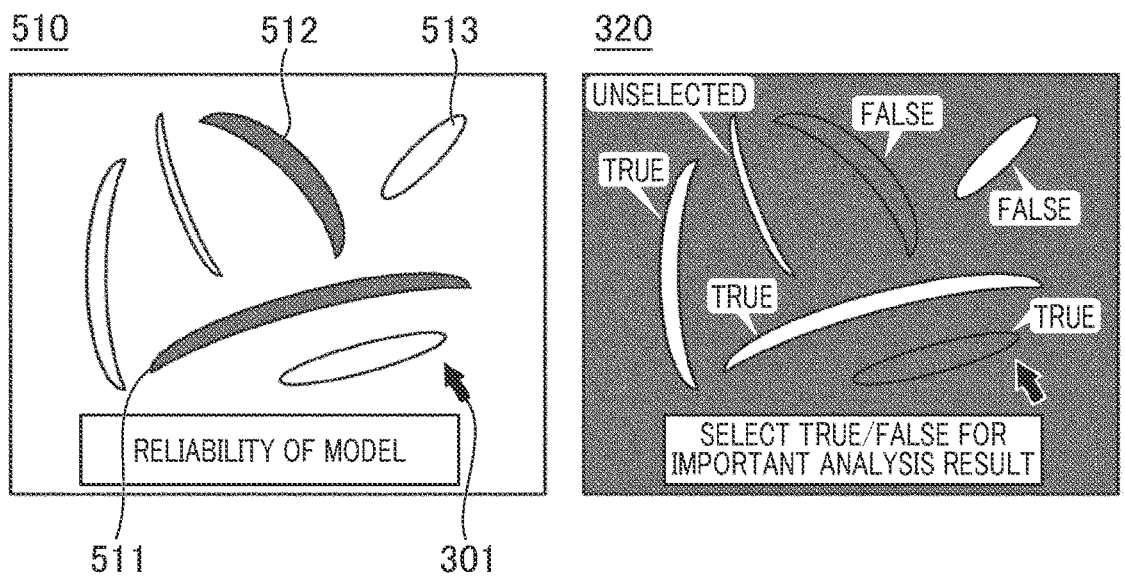
FIG. 5 is an explanatory view showing an example of correspondence between reliability and true/false of an analysis result.

FIG. 5 shows the relationship between the true/false selection result image 320 and a reliability display image 510. The reliability display image 510 is also disclosed in Non-Patent Literature 1 and shows the reliability of the model, but the reliability of the data can be displayed in the same manner. In this example, a portion where the reliability is lower than the threshold value is shown in gray, and a portion where the reliability is higher than the threshold value is shown in white. Here, a segment 511 portion corresponds to 410 (2), which is true in analysis result but low in model reliability. A segment 512 portion corresponds to 410 (4), which is false in analysis result and low in model reliability.

As to addition to the learning data, a set of an original image (input image to the image analysis device 110) corresponding to the true/false selection result image 320 and a true answer may be added to the learning data. Alternatively, the corresponding portion in the image (for example, the portion corresponding to the segment 511 or 512) may be specified by the cursor 301 to be cut out and added to the learning data.

In 410 (3), the reliability of the model is in a high state even though the analysis result is false, and corresponds to a segment 513 portion in FIG. 5. Here, it is judged that it is effective to change the model significantly by changing a learning setting value than adding the learning data. The learning setting value is, for example, a parameter for setting a learning condition at the time of learning execution or a hyper parameter for tuning a model.

On the other hand, a table 420 in FIG. 4 is an example of determining the learning condition from the true/false information of the analysis result and the reliability of the data, and determines whether or not the reliability of the data is high by using a threshold value c or d.

In 420(5), since it is determined that the analysis result is true and the reliability of the data is high, the result of its determination is presented so as to maintain the learning condition.

In 420 (6) and (8), it is considered that the reliability of the data is low and accidental noise is generated in the corresponding data. Even if the corresponding data is added to the learning data, the analysis accuracy is not improved, but on the contrary, there is a risk that the analysis accuracy will decrease. That is, it is better not to use the corresponding data for learning data. For this reason, there is presented that the use of the corresponding data as learning data is not recommended. In addition, in order to add learning data and improve the analysis accuracy, reacquisition of the data is presented. The reacquisition can be both the acquisition of images for different objects and the reacquisition of images for the same object. This is because even in the case of each image for the same object, it may be possible to acquire an image suitable for the learning data depending on the conditions (for example, shooting conditions). Specifically, it is expected that noise and halation in the image will be improved by re-shooting.

In 420 (7), it is judged that the reliability of the data is in a high state even though the analysis result is false, and it is effective to change the model significantly by changing the learning setting value rather than reacquiring the data.

Figure 3:
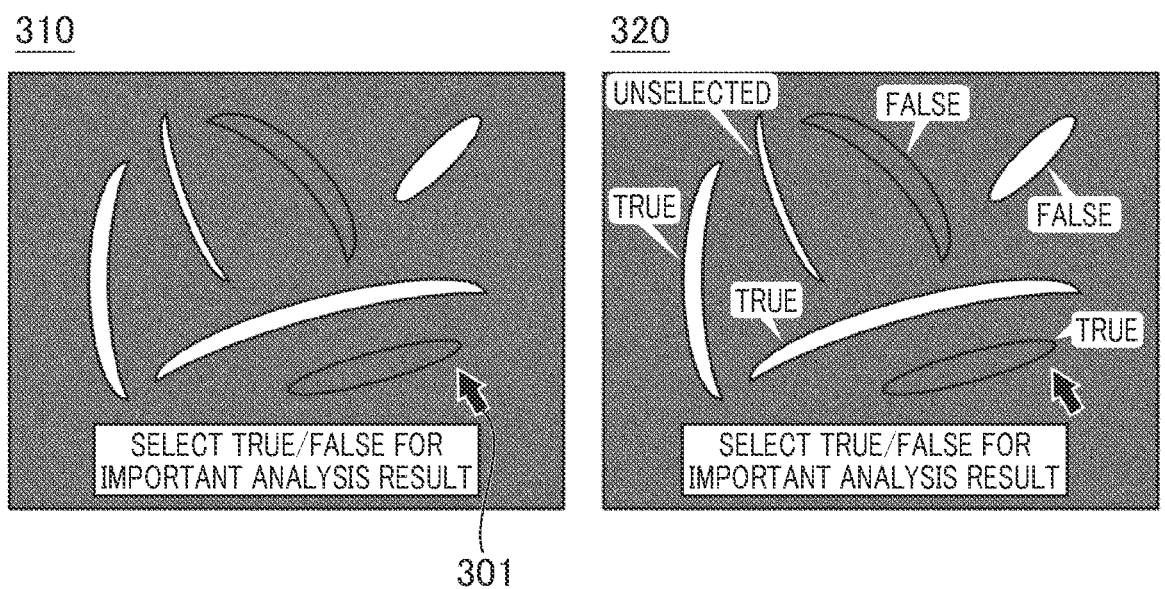
FIG. 3 is an explanatory view describing an example of a method of selecting the true/false of analysis by a user.

As described in FIG. 3, the display content generating unit 104 generates a display content to be presented to the user when the user selects the true/false of the image analysis in the input/output device 111. The display content may be such a display content that the user can determine that the analysis result is true or false, and in the case of image classification, the classification result may be displayed as characters or may be displayed as an image. In the case of image detection, the detected area of the image may be displayed with a frame or color added thereto, or only the detected area may be cut out and displayed. In the case of segmenting an image, the segmented areas of the image may be displayed with colors added thereto, or only the segmented areas may be cut out and displayed. In addition, the known technique may be used as long as it is a method showing the result of image analysis in the image. Further, such a display content that that multiple image analysis results of two or more are displayed side by side and the true/false of the image analysis is selected from them may be taken.

Figure 7:
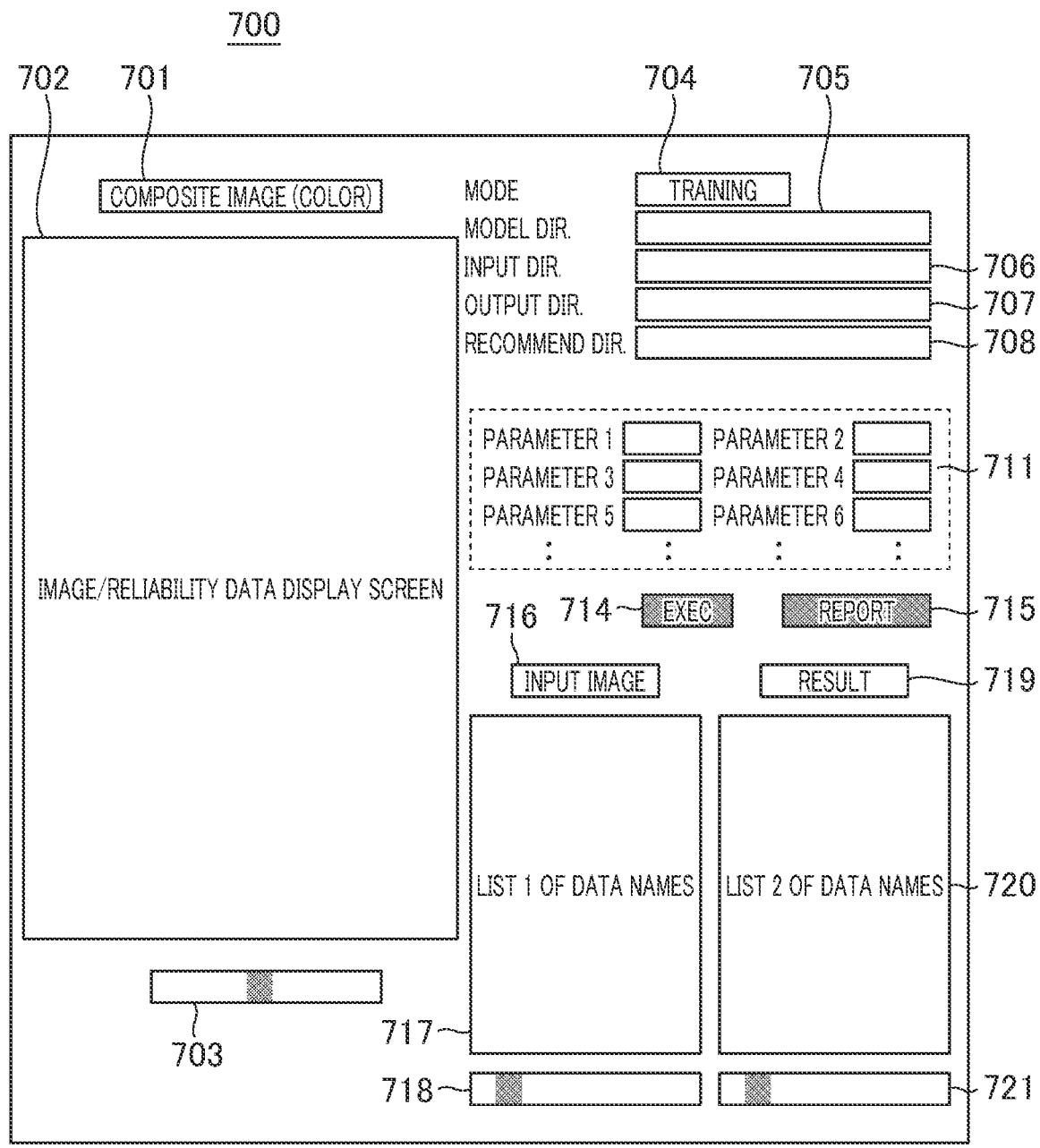
FIG. 7 is a plan view showing a screen example of interface used in the information processing for machine learning.

Further, the display content generating unit 104 also generates image data for displaying the output result of the learning condition output unit 103. In addition, such an interface image as described later in FIG. 7 is generated.

Only one of the determination based on the reliability of the model and the determination based on the reliability of the data shown in FIG. 4 may be performed independently, or both may be performed. In the case where both are performed, the determination is made based on the reliability of the data first, and the images which are not recommended for use in the learning data are excluded in 420 (6) and (8). Then, the determination is made based on the reliability of the model. Thus, it is better to prevent the deprecated data from being used for the learning data.

Figure 6:
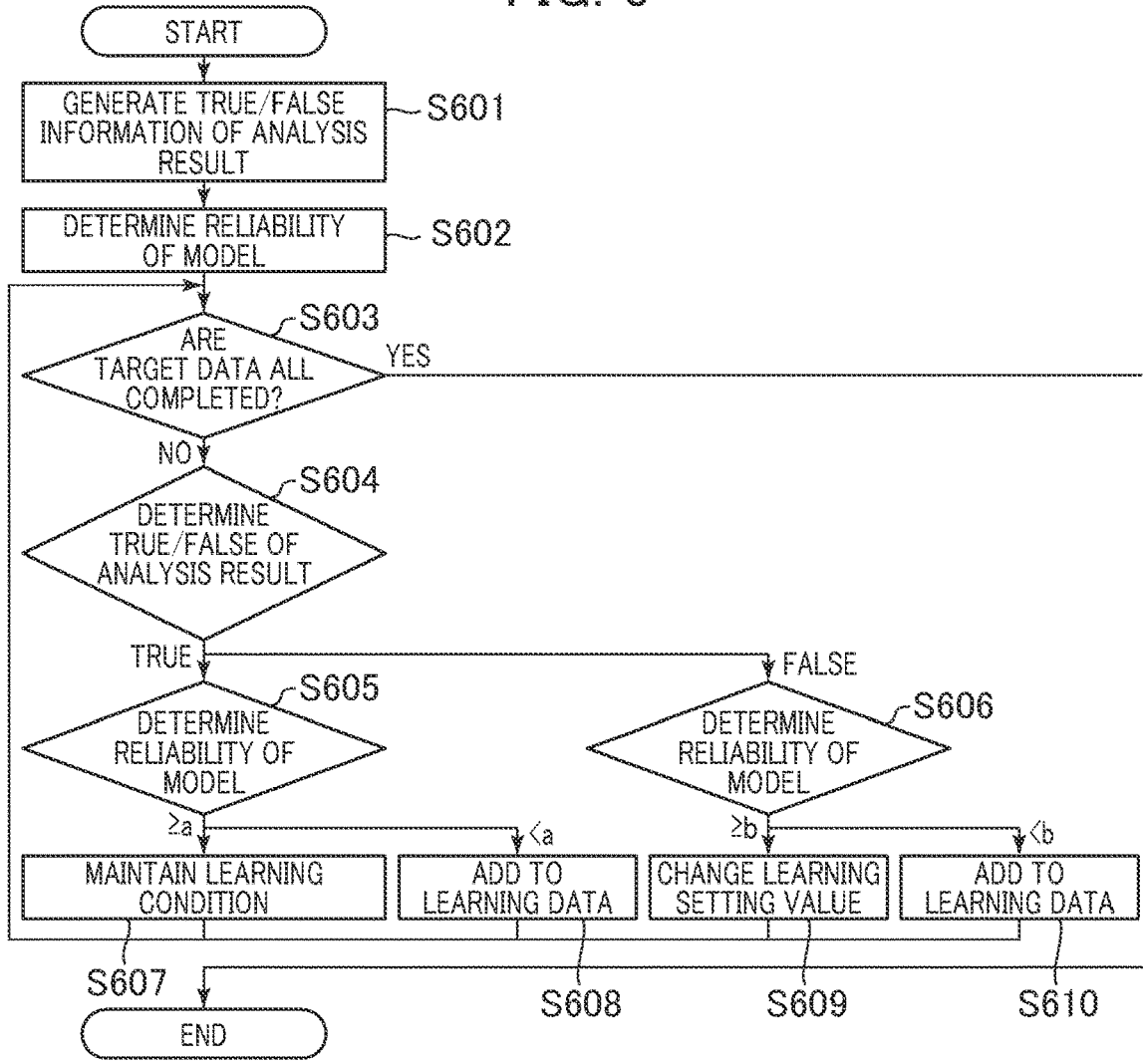
FIG. 6 is a flowchart showing information processing for machine learning.

FIG. 6 is a flowchart showing information processing for machine learning by the information processing apparatus 100 for machine learning. In FIG. 6, the processing of determining the learning condition from the true/false information of the analysis result and the reliability of the model is shown by a flowchart diagram.

The input to the information processing apparatus 100 for machine learning is an image analysis result input from the image analysis device 110 and a true answer input from the input/output device 111, for example, by the user. When it is assumed that the learning data is added, a new image (learning data candidate to be added) other than the learning data is used as an analysis target of the image analysis device 110.

In S601, the true/false information generating unit 101 generates true/false information on the basis of the information input from the image analysis device 110 and the input/output device 111. The true/false information may be given to each of the analysis result images, or may be given to each of one or more analysis results included in the analysis result image as in the example of FIG. 3. Further, the input/output device 111 may generate true/false information only for the image for which the user has determined the true/false. In that case, the data targeted in S603 is limited to the data for which the user has determined the true/false.

In S602, the reliability determining unit 102 determines the reliability of the model. The reliability of the model may be one having numerical values for the analysis result image as many as the number of image sizes (horizontal number of pixels×number of vertical pixels), or one having a single numerical value for one analysis result image, for example. A specific example of reliability determination is disclosed in, for example, Non-Patent Literature 1.

In S603, the data to be referred to in the present embodiment (for example, a learning data candidate to be added) is determined from the analysis result image. The processing from S604 to S610 is executed until the reference of all the target data is completed. When all the references are completed, the processing is terminated.

In S604, when the true/false information of the analysis result is referred to, and the analysis result is "true", the processing proceeds to S605. When the analysis result is "false", the processing proceeds to S606. In S605, it is determined whether or not the reliability of the model is equal to or higher than the threshold value a, and the processing proceeds to S607 or S608. In S606, it is determined whether or not the reliability of the model is equal to or higher than the threshold value b, and the processing proceeds to S609 or S610. The learning conditions shown in S607 to S610 are as described above.

Although the determination using the reliability of the model is described in FIG. 6, the same processing can be performed even with the reliability of the data. In that case, it goes without saying that c and d are used as the threshold values.

FIG. 7 shows an example of a GUI (Graphical User Interface) used when executing the information processing apparatus 100 for machine learning.

A screen 700 of the GUI includes an execution mode 704, a field 705 to specify a directory in which an initial deep network model is stored, a field 706 to specify a directory in which input data and learning data are stored, a field 707 to specify a directory in which estimation result data, reliability data, and the deep network model after learning are stored, a field 708 to specify a directory in which recommended data after analysis and the deep network model are stored, a field 711 to input an execution parameter or an analysis parameter, an execution button 714, a report output button 715, a screen 702 to display images or reliability data, and fields 701, 703, and 716 to 721 for designating information to be displayed on the screen 702.

The content of the screen 700 is generated by the display content generating unit 104 and displayed on, for example, an image monitor of the input/output device 111. In the field 705, a model to be mounted on the image analysis device 110 is selected. In the field 706, various data stored in the storage device are selected and called up. In the field 707, the generated data is stored in the storage device. In the field 708, the recommended data and models obtained as a result of the processing shown in FIG. 6 are stored. In the field 711, parameters to be set at the time of learning or execution of the model are input. The execution button 714 executes learning and analysis processing. The report output button 715 outputs, for example, the recommended data obtained as a result of the processing shown in FIG. 6 in a report format. On the screen 702, the images as shown in FIGS. 2, 3 and 5 are displayed simultaneously or by switching.

In the fields 716 and 719, input data (which can be displayed like 210 in FIG. 2, for example), true answer data (learning data), training data, inference result data (which can be displayed like 220 in FIG. 2, for example), reliability data (which can be displayed like 310 in FIG. 3, for example), and the like can be selected. Lists of data selected in the fields 716 and 719 are displayed in the fields 717 and 720 in a list form. Each data is stored in the storage device of the information processing apparatus 100 for machine learning or an external storage device. The fields 718 and 721 are gauges indicating the positions of the lists displayed in the fields 717 and 720.

In the field 701, composition (shading) and composition (color) can be selected, and data obtained by combining the data selected in the fields 717 and 720 with a gauge ratio of 703 is displayed on the screen 702. That is, in this example, different images can be displayed in an overlapping manner. In addition, a plurality of images may be displayed side by side.

In the execution mode 704, training, inference, analysis, and the like can be selected.

First, when the mode is set to the training mode or the inference mode in the execution mode 704, the appropriate directory is set to each of the fields 705 to 707, the execution parameter is set to the field 711, and execution button 714 is pressed, the training or inference of the model of the image analysis device 110 is executed according to the set directory and the execution parameter. The training or inference of the model can be executed by the known procedure. After the execution, the deep network model after learning, inference result data, and reliability data are stored in an output directory.

After the execution, by setting the fields 701, 703, and 716 to 721, the data to be displayed on the screen 702 can be displayed. That is, the input data, learning data, training data, inference result data, and reliability data can be referred to.

Next, the mode is set to the analysis mode, and the directory in which the recommended data after analysis or the like is stored is set to the field 708. When the analysis mode is executed, the processing shown in FIG. 6 is executed. The recommended data after the analysis is data which is recommended to be added as learning data, and is the data added in the processing S608 and S610 of FIG. 6.

By setting the fields 701, 703, and 716 to 721, the data to be displayed is displayed on the screen 702, and the selection of the true/false is performed, whereby the processing S601 of generating the true/false information of the analysis result can be executed. However, the true/false information of the analysis result may be generated and stored in advance. After that, the execution button 714 is pressed to execute the processing S602 to S610, so that the recommended data is stored in the directory of the field 708.

Further, even when there is a determination result that the learning condition should be maintained in the processing S607 of FIG. 6, the input/output device 111 displays the effect on the screen 702, for example. When there is a determination result that the learning setting value should be changed in the processing S609 of FIG. 6, the user adjusts an arbitrary parameter in the field 711.

After executing the additional learning or parameter change in this way, the mode is set to the training mode, the field 706 is set to the directory where the recommended data is stored, and the execution button 714 is pressed so that an improved post-learning deep network model, inference result data, and reliability data are stored in the directory of the field 707.

LIST OF REFERENCE SIGNS

100 . . . information processing apparatus for machine learning,
101 . . . true/false information generating unit,
102 . . . reliability determining unit,
103 . . . learning condition output unit,
104 . . . display content generating unit,
106 . . . bus

The invention claimed is:

1. An information processing apparatus for machine learning, comprising:
a memory;
an input device;
an output device; and
a processor communicatively coupled to the memory, the input device, and the output device, the processor is configured to:
generate true/false information of an image analysis result,
determine reliability related to analysis in image analysis processing, and
present, via the output device, a learning condition, based on the true/false information and the reliability, and
wherein the processor treats reliability as a numerical value, and when the numerical value is larger than a threshold value, presents a learning condition different from that when the numerical value is smaller than the threshold value.

2. The information processing apparatus for machine learning according to claim 1, wherein the processor generates the true/false information from the image analysis result and an operation result of a user input with respect to the image analysis result.

3. The information processing apparatus for machine learning according to claim 1, wherein the processor sets as true answer information, a result of analysis of an image to be analyzed by another method, and collates the image analysis result with the true answer information to generate the true/false information.

4. The information processing apparatus for machine learning according to claim 1, wherein the processor generates one true/false information for one image.

5. The information processing apparatus for machine learning according to claim 1, wherein the processor generates two or more true/false information for two or more analysis results included in one image.

6. The information processing apparatus for machine learning according to claim 1, wherein the learning condition includes adding an image corresponding to the image analysis result for which the true/false information is generated as learning data.

7. The information processing apparatus for machine learning according to claim 1, wherein the learning condition includes that it is deprecated to add an image corresponding to the image analysis result for which the true/false information is generated as learning data.

8. The information processing apparatus for machine learning according to claim 1, wherein the learning condition includes changing setting values related to learning.

9. The information processing apparatus for machine learning according to claim 1, wherein the learning condition includes reacquiring an image corresponding to the image analysis result for which the true/false information is generated.

10. The information processing apparatus for machine learning according to claim 1, wherein as for the reliability related to the analysis, the reliability of a model due to a model of image analysis processing is used.

11. The information processing apparatus for machine learning according to claim 1, wherein as for the reliability related to the analysis, the reliability of data due to image data to be analyzed is used.

12. A machine learning method of an image analysis device which is implemented with a model to which machine learning using learning data is applied and performs image analysis on an input image, the machine learning method executing:
a first step of making a true/false determination as to an analysis result of the image analysis device related to the input image;
a second step of evaluating the reliability of image analysis including at least one of model reliability and data reliability;
a third step of based on the true/false determination and the reliability of the image analysis, presenting at least one of maintaining the status quo, recommending that the input image is used for the learning data, recommending that the input image is not used for the learning data, and a change of a learning setting value; and
a fourth step of comparing the reliability of the model with a predetermined threshold value to identify the magnitude,
wherein in the third step, when the analysis result is true and the reliability of the model is high, the status quo is suggested to be maintained,
when the analysis result is true and the reliability of the model is low, the recommendation to use the input image for the learning data is presented,
when the analysis result is false and the reliability of the model is high, the change of the learning setting value is presented, and when the analysis result is false and the reliability of the model is low, the recommendation to use the input image for the learning data is presented.

13. The machine learning method according to claim 12, which executes a fifth step of comparing the reliability of the data with a second predetermined threshold value to identify the magnitude, wherein in the third step, when the analysis result is true and the reliability of the data is high, the status quo is suggested to be maintained, when the analysis result is true and the reliability of the data is low, the recommendation not to use the input image for the learning data is presented, when the analysis result is false and the reliability of the data is high, the change of the learning setting value is presented, and when the analysis result is false and the reliability of the data is low, the recommendation not to use the input image for the learning data is presented.

* * * * *